United States Patent Office 2,944,065
Patented July 5, 1960

2,944,065

BIS AMINO ETHYL DISULPHIDE COMPOUNDS

Maurice Joullie, Saint-Germain-en-Laye, and Michel Laurre, Gabriel Maillard, and Pierre Muller, Paris, France, assignors to Recherches et Propagande Scientifiques (Société à Responsabilité Limitée), Paris, France, a French company No Drawing. Filed Nov. 28, 1956, Ser. No. 624,732

Claims priority, application France Nov. 30, 1955

8 Claims. (Cl. 260—326)

This invention relates to bis-($\beta$-aminoethyl)disulphides and bis-($\beta$-acylaminoethyl)disulphides and to the preparation thereof.

According to the present invention there are provided compounds of the general Formula I:

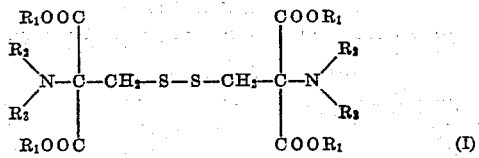

where $R_1$ is a lower alkyl group and $R_2$ is a hydrogen atom or an acyl group while $R_3$ is a hydrogen, or $R_2$ and $R_3$ together with the N to which they are attached represent a phthalamido group. The said compounds are the bis-($\beta$-amino-$\beta,\beta$-dicarbalkoxy ethyl)disulphides and bis-($\beta$-acylamido-$\beta,\beta$-dicarbalkoxyethyl)disulphides or bis-($\beta$-phthalimido-$\beta,\beta$-dicarbalkoxyethyl) disulphides. The said compounds are valuable intermediates for use in the synthesis of cystine to which they may be converted by hydrolysis and decarboxylation as described and claimed in our copending patent application Serial No. 624,733, filed November 28, 1956. The process described and claimed in our patent application Serial No. 624,733 for the synthesis of cystine comprises the step of subjecting a bis-($\beta$-amino-$\beta,\beta$-dicarbalkoxyethyl) disulphide, a bis-($\beta$-acylamido-$\beta,\beta$-dicarbalkoxyethyl) disulphide or a bis-($\beta$-phthalimido-$\beta,\beta$-dicarbalkoxyethyl) disulphide to decarboxylating hydrolysis by treating the same with a dilute strong acid, particularly dilute hydrochloric acid, under reflux at the boiling point of the mixture; the starting disulphide may be employed in the form of the crude product obtained by the reaction of an alkali metal lower alkyl amino (or lower alkyl lower alkanoylamido, or lower alkyl phthalimido) malonate with a bis-halomethyl disulphide in an anhydrous organic diluent, particularly ethanol, benzene, tolene or xylene, the diluent having been removed. Particular compounds within the scope of the invention are:

Bis-($\beta$-amino-$\beta,\beta$-dicarbethoxyethyl)disulphide.
Bis-($\beta$-formamido-$\beta,\beta$-dicarbethoxyethyl)disulphide.
Bis-($\beta$-acetamido-$\beta,\beta$-dicarbethoxyethyl)disulphide.
Bis-($\beta$-phthalimido-$\beta,\beta$-dicarbethoxyethyl)disulphide.
Bis-($\beta$-benzamido-$\beta,\beta$-dicarbethoxyethyl)disulphide.

According to a further feature of the invention the aforesaid compounds of general Formula I are produced by condensing, in an anhydrous organic medium a compound of the Formula II:

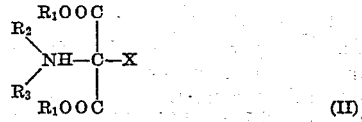

where $R_1$ $R_2$ and $R_3$ have the significance indicated above and X is an atom of an alkali metal, with a compound of the Formula III:

$$Y-CH_2-S-S-CH_2-Y \qquad (III)$$

where Y is a halogen atom.

Preferably in the foregoing process X is sodium or potassium, Y is chlorine, and the reactants are present substantially in the proportion of two molecular equivalents of the compound of Formula II per one molecular equivalent of the compound of Formula III. The reaction medium may be a hydrocarbon such as benzene or toluene or may be other organic liquids as hereinafter set forth.

The product obtained in a crude form may contain partial hydrolysis products. Thus, using sodium ethyl acetylamido malonate and bis-chloromethyl disulphide as the reactants there may be obtained the desired product of Formula IV:

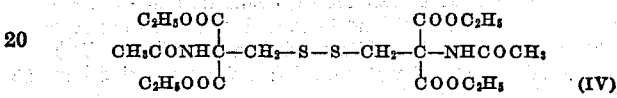

together with the disulphide of Formula V:

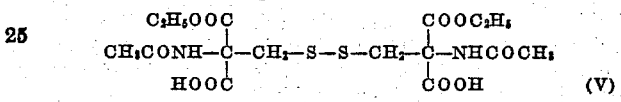

and the di-aza lactone compound of Formula VI:

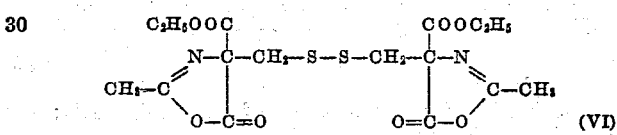

The calculated analysis of these compounds is as follows: Formula IV.—C=45.80%; H=6.16%; N=5.34%; S=12.22%. Formula V.—C=41.02%; H=5.16%; N=5.98%; S=13.69%. Formula VI.—C=44.43%; H=4.66%; O=29.60%; N=6.48%; S=14.83%.

The desired compound of Formula IV can be isolated by fractional crystallisation but since in the use of the compound to produce cystine the by-products are also effective it is generally unnecessary to purify the product for commerical use.

While the aforesaid process may be carried out, as indicated above using benzene or toluene as the anhydrous organic medium, it is found that the condensation proceeds more rapidly and completely if the reaction is effected in a medium of absolute ethanol.

The following examples will serve to illustrate the invention but are not to be regarded as limiting it in any way: all the melting points are measured with a Thiele tube.

EXAMPLE I

*Intermediates*

A. Pure bis-chloromethyl disulphide $$(ClCH_2-S-S-CH_2Cl)$$

prepared and purified for example according to the data given by Davies and Hambly, Australian J. Chem., 1953, 6, 152–155, is employed; this disulphide is rectified in vacuo in a very tall column, for example a Vigreux column (with a height of 1.20 m.) in order to render it very pure.

B. Sodium ethyl acetamido malonate may be prepared by the action of sodium on ethyl acetamido malonate in xylene, but the method is slow and not very practical. The following method of preparation is therefore preferred:

2.82 g. of sodium are dissolved in 50 cc. of anhydrous ethanol (distilled over magnesium according to the technique indicated by Vogel, "A Text Book of Practical Organic Chemistry," pp. 165–166) in a flash equipped with a stirrer mechanism; 26.65 g. of anhydrous ethyl acetamido malonate dissolved in 300 cc. of anhydrous benzene are then added gradually. The flask is then equipped with a reflux condenser in addition to the stirrer mechanism, the said condenser being fitted at its end with a calcium chloride tube. After stirring for 2 hours at boiling point, a yellowish-white precipitate becomes apparent. Distillation is then carried out until there is no longer any alcohol present in the distillate. For this purpose, it is necessary to distil about 200 cc. of solvent.

*Process*

The distillation residue from B is made up to 300 cc. with anhydrous benzene and 10 g. of the pure bis-chloromethyl disulphide are added all at once. The mixture is refluxed for 10 hours. After cooling, the benzene and the reaction products form a yellowish-white gel.

The benzene is driven off by distillation at ordinary pressure on an oil bath and then, under reduced pressure (20 mm.), 36 g. of a white product are obtained. This is washed in distilled water until free from chlorine ions (6 washing operation).

The product is then worked up into a paste twice in boiling alcohol, this paste being dried after cooling and being dissolved in 600 cc. of boiling ethanol (96% by volume) after cooling to 0° C. it is centrifuged and dried in vacuo over sulphuric acid; 17 g. of a product are recovered, this product melting at 178–179° C.

After being crystallised twice in ethanol, the melting point becomes constant at 181–184° C.; the yield is 61%.

Analysis shows:
Calculated (for compound of Formula IV): N=5.34%. Found: N=5.70%.
Calculated (for compound of Formula IV): S=12.22%. Found: S=12.49–12.81%.

5 g. of this product are washed with 40 cc. of 8% ammonia and then with 40 cc. of 10% aqueous hydrochloric acid, then washed in water and dissolved and recrystallised in 100 cc. of ethyl alcohol at 96°; the melting point remains at 181–184°.

Analysis shows:
Calculated: C=45.80%; H=6.15%; N=5.34%; S=12.22%. Found: C=41.26–41.18%; H=5.52–5.55%; N=5.69–5.59%; S=13.75–13.61%.

The product is dissolved and recrystallised once again in anhydrous toluene and then in 75 cc. of a mixture consisting of equal parts of ethyl acetate, acetic acid and butanol. After being purified five times, the following data are found for the crystallised fraction (melting point 183–185°):
Calculated: N=5.34%; S=12.22%. Found: N=5.50–5.45%; S=13.43–13.27%.
And for the dissolved fraction:
Calculated: N=5.34%; S=12.22%. Found: N=5.51–5.53%; S=13.64–13.40%.

Since the two fractions are identical, they are combined and after being dissolved and recrystallised 10 times in succession in ethanol at 96°, a product is obtained which melts at 181–182.5°, analysis of which shows:
Calculated: N=5.34%; S=12.22%. Found: N=5.83–5.81%; S=12.91–13.14%.

Several identical preparations were carried out with the same operational units and closely similar analytical results were obtained.

The recovered product is always insoluble in water, insoluble in dilute hydrochloric and ammonia solutions, insoluble in concentrated ammonia but soluble in concentrated hydrochloric acid and concentrated acetic acid. It is also soluble at boiling point in benzene, toluene, xylene, dibutyl ether, ethyl acetate, ethanol and methanol; it is insoluble at boiling point in cyclohexane, diisopropyl ether and diethyl ether.

As indicated above, compounds of different Formulae IV, V and VI can result from this synthesis. Others more or less hydrolysed intermediate products may exist in minor proportions.

Deacetylated compounds are not present since the product obtained does not produce any colouring of ninhydrin.

Accordingly it is clear, from the analytical figures that the compound obtained is bis-(β-acetamido-β-β-dicarbethoxy ethyl)disulphide, contaminated by partially hydrolysed products, such as those of Formulas V and VI.

Industrially, it is of little interest to endeavour to isolate the bis-(β-acetamido-β-β-dicarbethoxy ethyl)disulphide in the pure state, because the more or less hydrolysed compounds which accompany it themselves also lead to cystine, the result not depending on the degree of purity of the disulphide.

Instead of operating in benzene, it is also possible to operate in toluene; the reaction then proceeds slightly more quickly.

EXAMPLE II

*Bis-(β-acetamido-β-β-dicarboethoxy ethyl)disulphide*

(a) PREPARATION IN XYLENE 47.8 g. of sodium ethyl acetamidomalonate are placed in 300 cc. of anhydrous xylene. The mixture is refluxed with stirring at 129–130° C. 16.3 g. of bis-chloromethyl disulphide are slowly introduced. The mixture is kept at boiling point for 4 hours. After cooling, the sodium chloride precipitate is isolated and washed three times with boiling xylene and the solvent is driven off by vacuum distillation.

The product is dissolved and recrystallised in a mixture of cyclohexane and xylene (50:50). About 30 grams of pure product are obtained, the melting point thereof being 125–125.5° C.

The compound is soluble in cold acetone and insoluble in water; it is sparingly soluble in ether and methanol, sparingly soluble in cold ethanol and very soluble in hot ethanol, as well as in benzene.

*Analysis.*—Calculated: C%=45.80; H%=6.10; N%=5.34; S%=12.22. Found: C%=45.61–45.88; H%=5.91–5.97; N%=5.32–5.41; S%=11.95–12.10.

(b) PREPARATION IN ANHYDROUS ALCOHOL 4.6 g. of sodium are dissolved in 150 cc. of anhydrous alcohol in a flask identical to that previously referred to. After dissolution, 43.6 g. of ethyl acetamido malonate are added while stirring mechanically. After being in contact for half an hour, 16.3 g. of bis-chloromethyl disulphide are added all at once.

The mixture is refluxed with stirring for 30 minutes. After cooling, the sodium chloride is eliminated by filtration and then the filtrate is concentrated in vacuo. The residue is dissolved and recrystallised in a boiling mixture of cyclohexane and xylene (50:50). Colourless crystals are obtained which melt at 125.5° C. The yield is 50 to 55% of pure product.

*Analysis.*—Calculated: C%=45.80; H%=6.10; N%=5.34; S%=12.22. Found: C%=45.70–45.80; H%=5.90–6.01; N%=5.53–5.58; S%=12.48–12.55.

EXAMPLE III

*Bis-(β-formamido-β,β-dicarbethoxy ethyl)disulphide*

(a) PREPARATION IN XYLENE 45 g. of ethyl formamido malonate are placed with 350 cc. of anhydrous xylene in a 500 cc. flask equipped with mechanical stirrer device, a reflux condenser, a funnel and a thermometer. The mixture is brought to 50 to 60° C. and 16.3 g. of bis-chloromethyl disulphide are added while stirring.

The mixture is then maintained under reflux for 2 hours. After cooling, the precipitate is separated on a fritted glass funnel and rinsed three times with boiling xylene. The filtrate is concentrated to a small volume, the resulting precipitate is filtered off and then recrystallised in a mixture of xylene and benzene (50:50).

A product melting at 107° C. is obtained in a yield of 50 to 60%.

This compound is insoluble in water; it is soluble in cold methanol cold benzene, hot dioxane and hot isopropyl ether.

*Analysis.*—Calculated: C%=43.54; H%= 5.64; N%=5.64; S%=12.90. Found: C%=43.60–43.80; H%=5.67–5.67; N%=5.72–5.79; S%=13.20–13.05.

(b) PREPARATION IN ANHYDROUS ALCOHOL 200 cc. of absolute ethanol are placed with 4.6 g. of sodium in a flask equipped with the same devices as previously referred to. When the alcoholic solution is at a temperature of 40° C. there are added 40.6 g. of ethyl formamido malonate dissolved in 100 cc. of ethanol.

The mixture is stirred for half an hour. After this time, when the temperature is 30° C., 16.3 g. of bis-chloromethyl disulphide are introduced slowly and the mixture is heated under reflux for one hour.

After cooling, the mixture is filtered in order to eliminate the sodium chloride which has formed; the alcohol is removed by vacuum distillation and the residue is dissolved and recrystallised in a 50:50 mixture of isopropyl ether and benzene.

The yield of pure product is 75 to 80% and the melting point thereof is 107° C.

*Analysis.*—Calculated: C%=43.54; H%=5.65; N%=5.64; S%=12.90. Found: C%=43.70–43.61; H%=5.65–5.75; N%=5.57–5.63; S%=13.14–12.95.

EXAMPLE IV

*Bis-(β-phthalimido-β, β-dicarbethoxy ethyl)disulphide*

(a) PREPARATION IN XYLENE 66 g. of sodium ethyl phthalimido malonate are placed with 500 cc. of xylene and 16.3 g. of bis-chloromethyl disulphide in a 1 litre flask equipped with a mechanical stirrer device, a reflux condenser and a thermometer.

The mixture is brought to a condition of gentle reflux for 14 hours, on an oil bath adjusted to 55° C. After this time, the cooled mixture is filtered on a fritted glass funnel in such manner as to eliminate the sodium chloride. This is washed three times with boiling xylene and then the filtrate and the combined washing waters are concentrated in vacuo to a small volume.

The separated product is dissolved and recrystallised twice in boiling methanol. About 20 grams of the desired product are obtained, its melting point being 113.5–114° C.

A considerable part of the ethyl phthalimido malonate which has not reacted and also of the bis-chloromethyl disulphide are recovered.

The product is insoluble in water, fairly soluble in hot cyclohexane and insoluble in cold cyclohexane, very soluble in hot methanol and insoluble in cold methanol, soluble in hot butyl ether and insoluble in cold butyl ether, soluble in hot isopropyl ether and insoluble in cold isopropyl ether, soluble in hot dioxane and insoluble in cold dioxane, and very sparingly soluble in hot carbon tetrachloride.

*Analysis.*—Calculated: C%=54.85; H%=4.57; N%=4.00; S%=9.14. Found: C%=55.00–54.90; H%=4.29–4.37; N%=4.00–4.16; S%=9.42–9.25.

8 g. of a black resinous product is isolated in the crystallisation liquors.

(b) PREPARATION IN ANHYDROUS ALCOHOL 200 cc. of anhydrous alcohol and 4.6 g. of sodium are placed in a flask identical with that referred to above. When the temperature reaches 30° C., 64 g. of ethyl phthalimido malonate dissolved in 200 cc. of ethanol are added. After stirring for half an hour (time for formation of the sodium salt), 16.3 g. of bis-chloromethyl disulphide dissolved in 100 cc. of ethanol are added. The introduction is completed in half an hour.

After this time, the mixture is kept for half an hour at ordinary temperature while stirring and then the mixture is heated under reflux for 2½ hours. After cooling, the solution is filtered and the alcohol driven off under vacuum. The product is dissolved and recrystallised in methanol. There are obtained 46 g. of partially hydrolysed product, melting at 118.5–119° C. the remainder being in a syrupy condition.

*Analysis.*—Calculated: C%=54.85; H%=4.57; N%=4.00; S%=9.14. Found: C%=54.57–54.36; H%=5.74–5.50; N%=3.57–3.60; S%=7.86–7.99.

EXAMPLE V

*Bis-(β-benzamido-β.β-dicarbethoxy ethyl)disulphide*

Operating in accordance with the method of Example IVb but replacing the ethyl phthalimido malonate by ethyl benzamido malonate, a product is obtained which after being dissolved and recrystallised in isopropyl ether, has a melting point of 89 to 89.5° C.; the yield is 55%.

*Analysis.*—Calculated: C%=55.55; H%=5.55; N%=4.32; S%=9.88. Found: C%=55.35–55.15; H%=5.40–5.47; N%=4.25–4.32; S%=9.84–9.85.

The product is insoluble in water, fairly soluble in cold methanol, sparingly soluble in cold ethanol and very soluble in hot ethanol, insoluble in petroleum ether, sparingly soluble in ethyl ether, very sparingly soluble in cold isopropyl ether but very soluble in hot isopropyl ether and soluble in cold benzene.

EXAMPLE VI

*Preparation of bis-(β-amino-β.β-dicarbethoxy ethyl)disulphide*

200 cc. of anhydrous ethanol and 4.6 g. of sodium are placed in a flask similar to that of Example III. The solution is cooled to the region of 5° C. by an ice bath. There are then added 35 g. of ethyl amino malonate dissolved in 100 cc. of anhydrous ethanol, while stirring and under a current of nitrogen.

After 20 minutes, a yellowish precipitate has been formed. 16.3 g. of bis-chloromethyl disulphide diluted in 100 cc. of anhydrous ethanol are then added in half an hour. This operation is carried out under nitrogen and while stirring.

After the introduction, the mixture is left at ordinary temperature for half an hour. It is then heated for 10 minutes at 40° C. It is necessary not to exceed this temperature so as to avoid causing liberation of hydrogen sulphide.

During the reaction, the heterogeneous mixture changes from yellow to a milky white colour. After cooling, the sodium chloride precipitate is removed by centrifuging and the solution is concentrated in vacuo at 30° C. or below. The ethanol is completely eliminated under nitrogen.

The oil obtained (yield 40%) is dissolved in 33⅓% aqueous hydrochloric acid and the impurities are eliminated by extracting three times with diethyl ether. The hydrochloric acid solution is then neutralised by 33⅓% aqueous ammonia and the precipitated oil is taken up in diethyl ether. The ethereal solution is dried over sodium sulphate and the diethyl ether is completely driven off under vacuum.

This oily product cannot be obtained in crystalline form and cannot be distilled. In order to prove the identity of this product, it was treated with acetic anhydride; the acetamide derivative previously described was obtained.

In the preceding examples, the alcohol which esterifies the carboxylic groups can be other than ethyl alcohol.

We claim:

1. A compound of the general formula:

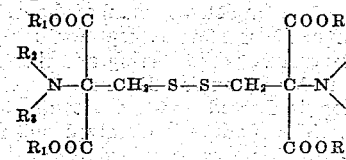

wherein $R_1$ is a lower alkyl group and the groups

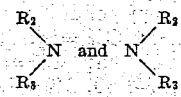

are identical groups selected from the class consisting of amino, formamido, acetamido, benzamido and phthalimido groups.

2. Bis-($\beta$-amino-$\beta$.$\beta$-dicarbethoxyethyl)disulphide.
3. Bis-($\beta$-acetamido-$\beta$.$\beta$-dicarbethoxyethyl)disulphide.
4. Bis-($\beta$-formamido-$\beta$.$\beta$-dicarbethoxyethyl)disulphide.
5. Bis-($\beta$-phthalimido-$\beta$.$\beta$-dicarbethoxyethyl)disulphide.
6. Bis-($\beta$-benzamido-$\beta$.$\beta$-dicarbethoxyethyl)disulphide.
7. A process for the production of a compound of the general formula:

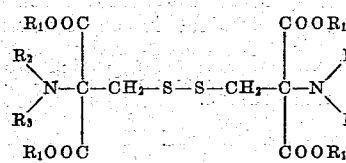

wherein $R_1$ is a lower alkyl group and the groups

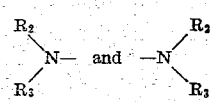

are identical groups selected from the class consisting of amino, formamido, acetamido, benzamido and phthalimido groups which comprises condensing in an anhydrous organic medium selected from the group consisting of benzene, toluene, xylene and ethanol substantially 2 molecular equivalents of a compound of the formula:

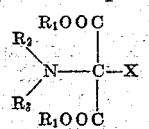

where

is defined as above, X is an atom of an alkali metal, with one molecular equivalent of a compound of the formula:

$$Y-CH_2-S-S-CH_2-Y$$

where Y is a halogen atom.

8. A process for the production of a compound of the general formula:

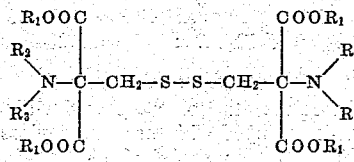

wherein $R_1$ is a lower alkyl group and the groups

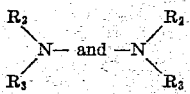

are identical groups selected from the class consisting of amino, formamido, acetamido, benzamido and phthalimido groups which comprises condensing in an anhydrous ethanol medium substantially 2 molecular equivalents of a compound of the formula:

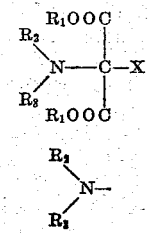

where is defined as above, X is an atom of an alkali metal, with one molecular equivalent of a compound of the formula:

$$Y-CH_2-S-S-CH_2-Y$$

where Y is a halogen atom.

References Cited in the file of this patent
UNITED STATES PATENTS

| | | |
|---|---|---|
| 2,393,327 | Langkammerer | Jan. 22, 1946 |
| 2,430,455 | Crooks | Nov. 11, 1947 |
| 2,466,232 | Harris | Apr. 5, 1949 |
| 2,478,788 | Snyder et al. | Aug. 9, 1949 |

OTHER REFERENCES

Swan: Nature, May 11, 1957, p. 965.